United States Patent Office 3,118,887
Patented Jan. 21, 1964

3,118,887
O-HYDROXY SUBSTITUTED TRIS ARYL-S-TRIAZINES
William B. Hardy, Bound Brook, Jerry P. Millionis, South Bound Brook, and Frank G. Pinto, Middlesex, N.J., assignors to American Cyanamid Company, New York, N.Y., a corporation of Maine
No Drawing. Filed Mar. 6, 1961, Ser. No. 93,349
5 Claims. (Cl. 260—248)

This invention relates to the stabilization of polymeric materials against the deteriorating effects of ultraviolet light.

More particularly, this invention relates to the stabilization of plastic and resinous compositions from ultraviolet light by the incorporation therein of one or more members of a class of tris-aryl-triazines wherein the aryl radicals are carbocyclic groups of less than three 6-membered rings and at least one of the aryl radicals is substituted by an hydroxy radical which is ortho to the point of attachment to the triazine nucleus, all further substituents being either hydroxy, alkyl, alkoxy, sulfonic, carboxy, halo, haloalkyl or acylamino (wherein the acyl is derived from a carboxylic acid).

A good ultraviolet absorber for use in polymeric materials should absorb the ultraviolet in sunlight and at the same time be a colorless material by visual observation. The compound should impart no color to the composition, should be sufficiently stable to withstand the conditions of curing of the polymer, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no color is visible. In addition, to be effective, it should show a high degree of absorbency in the desired wave length range. As a measure of the degree of absorbency, an absorption index may be used. This is a relation expressed as a figure to show an index of the degree of absorption per amount of material at a particular wave length (defined below). A high absorbency index indicates greater absorption. However, for the most desirable ultraviolet protection, the high absorbency index should be at those wave lengths sufficiently below the visual range so that the compound has no yellow color visually.

The compounds useful for the present invention are good ultraviolet absorbers. Structurally, they may be represented by the following general Formula I:

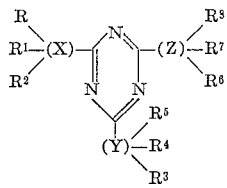

wherein X, Y and Z are each aromatic, carbocyclic radicals of less than three 6-membered rings (e.g., phenyl, naphthyl and biphenyl), X being substituted by an hydroxy group ortho to the point of attachment to the triazine nucleus; and each of R, R¹, R², R³, R⁴, R⁵, R⁶, R⁷, and R⁸ being either hydrogen, hydroxy (preferably in the 2,4 and/or 5 position of the aromatic nucleus), alkyl (e.g., methyl, t-butyl, cyclohexyl, t-octyl, n-octyl and dodecyl), alkoxy (e.g., methoxy, n-butoxy, 2-ethylhexyloxy and n-octyloxy), sulfonic, carboxy, halo (e.g. iodo, bromo, and chloro), haloalkyl (e.g. dichloromethyl and trifluoromethyl) and acylamino (e.g. alkanoylamino such as acetamido; monocyclic carbocyclic aroylamino such as benzamido, and monocyclic carbocyclic aromatic-lower alkyl amino such as phenylacetamido).

A preferred class of triazines within the scope of Formula II is:

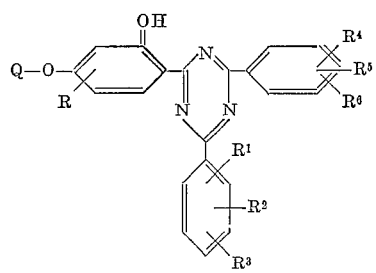

wherein Q is hydrogen or alkyl (e.g., methyl, ethyl, propyl, n-butyl, t-butyl, cyclohexyl, n-hexyl, n-octyl and n-dodecyl and R, R¹, R², R³, R⁴, R⁵, and R⁶ are as hereinbefore defined.

A particularly preferred class of ultraviolet absorbers for the purpose of this invention are symmetrical trisortho-hydroxyphenyl (or naphthyl)-s-triazines further substituted in the aryl moieties at the 4-position, i.e., meta to the hydroxy group by an hydroxy or alkoxy radical.

The derivatives of Formula I may be prepared by a number of different methods. One convenient method involves the trimerization of either an ortho-hydroxy substituted aryl amide or an ortho-hydroxy substituted aryl nitrile. The trimerization is accomplished by heating either the nitrile or the amide above its melting point, but at a temperature below decomposition. Suitable amides for this purpose are substituted salicylamides as alkylsalicylamides (e.g. 4-methylsalicylamide); hydroxysalicylamides, alkoxysalicylamides (e.g. 4-octyloxysalicylamide, 5-methoxysalicylamide and 4-dodecyloxysalicylamide), sulfo-alkoxysalicylamides (e.g. 5-sulfo-4-octyloxysalicylamide); carboxysalicylamides (e.g. 4-carboxy-5-methylsalicylamide); halosalicylamides (e.g. 4-chlorosalicylamide and 5-iodosalicylamide); halomethylsalicylamides (e.g. 4-trifluoromethylsalicylamide and 5-dichloromethylsalicylamide); and acylaminosalicylamides (e.g. carboxamidosalicylamides such as 4-acetamidosalicylamide and 4α-phenylacetamidosalicylamide); β-hydroxy-α-naphthamides and α-hydroxy-β-naphthamides such as 2-hydroxy-1-naphthamide, 1-hydroxy-2-naphthamide; 3-methyl-2,4-dihydroxy-1-naphthamide; alkoxy-2-hydroxy-1-naphthamides (e.g. 4-butoxy-2-hydroxy-1-naphthamide, 4-octyloxy-2-hydroxy-1-naphthamide, and 4-dodecyloxy-2-hydroxy-1-naphthamide); sulfo-2-hydroxy-1-naphthamides; carboxy-2-hydroxy-1-naphthamides; halo-2-hydroxy-1-naphthamides (e.g. 4-chloro-2-hydroxy-1-naphthamide); halomethyl-2-hydroxy-1-naphthamides; acylamino-2-hydroxy-1-naphthamide; and 4-phenylsalicylamide. The corresponding nitrile compounds can likewise be trimerized.

Another method of preparing triazine derivatives within the scope of Formula I is to react a cyanuric halide e.g. cyanuric chloride with a carbocyclic aromatic compound of less than three 6-membered rings. The substituents on the carbocyclic nucleus should correspond to those present on the triazine compound of Formula I. If an amount at least equivalent to the number of halogen atoms in the cyanuric halide is used, either in the absence of a solvent or in the presence of an inert solvent, a symmetrical tris-orthohydroxyaryl-triazine is obtained. If, on the other hand, it is desired to obtain asymmetrical-triaryl-triazines, the cyanuric halide is reacted with either one or two molecular proportions of the aromatic compound to yield intermediates which are then treated with one or two molecular proportions of another aromatic compound to yield a second intermediate. This is finally treated with a third aromatic compound to yield a compound within the scope of Formula I. The condensation reaction with cyanuric chloride is conducted in the presence of acid catalyst such as aluminum chloride. The acid catalyst should be present in an amount generally equivalent to the number of halogens being substituted.

For the substitution of the group which corresponds to X in Formula I, various hydroxyaryl compounds of less than three 6-membered rings can be used. For the substitution of the radicals corresponding to Y and Z in Formula I, aryl compounds, with or without, hydroxy radicals can be used. In all cases, the final triazine derivative should contain at least one orthohydroxyaryl radical.

Triazine derivatives of Formula I are useful to protect plastic and resinous compositions against the deteriorating effect of ultraviolet light. Thus, while showing a high degree of absorbency in the ultraviolet light range, they transmit visible light almost completely. They are, thus, especially useful in providing protection where discoloration is an undesirable effect.

Generally, any type of polymeric formulation may thus be protected. Among the tremendous array of suitable synthetic resin carrier material capable of forming either rigid plastics or elastomers may be mentioned the acrylic resin, as exemplified by the polymers of acrylic acid, methacrylic acid, methyl acrylate, acrylamide, N-methylolacrylamide, acrylonitrile and copolymers of these with styrene, vinylpyridines, etc.; the linear superpolyamides such as nylon; neoprene; condensates of aldehydes, especially formaldehyde and formaldehyde engendering substances such as parafomaldehyde, and hexamethylene tetramine with urea, thiourea and aminotriazines such as melamine and benzoguanamine, as well as their ethers with aliphatic alcohols as exemplified by methanol and butanol; modified and unmodified condensates of hydroxy benzenes like phenol, resorcinol, etc., with the aforementioned aldehydes; silicones such as dimethyl and methyl hydrogen polysiloxanes; unsaturated, saturated and modified alkyd resins including the combinations of unsaturated polyesters with cross-linking monomers such as styrenated alkyds; the polyolefins as for instance the polymers of ethylene, propylene, isobutylene, etc.; vinyl polymers including polyvinyl butyral and other acetals, polyvinyl chloride, polyvinylidene chloride, polyvinyl fluoride, polyvinyl acetate and its hydrolysis products, polyvinyl chloride-acetate, styrene and substituted styrene (especially of ring-substituted styrenes, e.g., o-, m- and p-methyl styrene) polymers and copolymers with acrylonitrile and other termnial ethylenic monomers such as butadiene and the like; co-polymers of vinylidene chloride with vinyl chloride; cellulose ethers as exemplified by ethyl and methyl cellulose; cellulose esters including the nitrate, acetate, propionate, butyrate, etc.; regenerated cellulose; polycarbonates fluorocarbon polymers such as polytetrafluoroethylene and polytrifluoroethylene; rubber hydrochloride; chlorinated rubber; elastomers such as polymeric dienes, e.g., polychlorobutadiene, polybutadiene, polyisoprene and copolymers of polybutylene, polyethylene glycol and polypropylene glycol; epoxy resins, as exemplified by the condensates of epichlorohydrin with bis-phenol, diphenylol propane, etc.; polyoxymethylene, polyurethane or isocyanate resins as well as copolymers and simple mixtures of homo- and copolymers of any two or more of such materials. This list is not meant to be limiting or exhaustive but merely to illustrate the wide range of polymeric carriers which may be employed in the present invention, as the vast majority of synthetic resins can be used. Thus, ultraviolet absorbers of this invention can be included with especial advantage in polyester resins such as are described in U.S. 2,255,313, U.S. 2,443,735, U.S. 2,443,736, U.S. 2,443,737, U.S. 2,443,738, U.S. 2,443,739, U.S. 2,443,740 and U.S. 2,443,741. Such resins are prepared from unsaturated polyester resins prepared from alphabeta unsaturated polycarboxylic acids such as maleic, fumaric, itaconic, monochloro maleic anhydride and the like. These unsaturated acids are usually present in amount approximating at least 20% by weight of the total weight of the polymeric polycarboxylic acids used and preferably in amounts varying between about 25 and 65% by weight based on the total weight of the polycarboxylic acid present. If it is desired to make use of saturated polycarboxylic acid, that is, those which are free of non-benzenoid unsaturation, they also include such acids as phthalic, maleic, succinic, glutaric, sebacic and chlorinated polycarboxylic acid such as tetrachloro phthalic acid and the like, preferably in amounts less than a larger proportion of the total amount of polycarboxylic acid present.

These acids are condensed with polyhydric alcohols to form the unsaturated polyesters. Usually it is preferred to use alcohols having only two hydroxyl groups although minor amounts of alcohols having three or more hydroxy groups may be used. As dihydroxy alcohols one can use ethylene glycol, diethylene glycol, propylene glycol, dipropylene glycol, butanediol-1,4, butanediol-1,3, butanediol-1,2, pentanediol-1,2, pentanediol-1,3, pentanediol-1,4, pentanediol-1,5, hexanediol-1,6, and the like. Additionally one can use glycerine, pentaerythritol and the like. Esterification of the alcohol is carried out until an acid niumber of the mixture has been reduced to not over 55.

These polyester groups very often are modified by incorporation of a polymerizable material having a polymerizable $CH_2=C<$ group. Among these polymerizable compounds are styrene, substituted styrene such as alpha-methylstyrene, and alphaethylstyrene, a ring substituted styrene such as alkyl styrenes and the like. There are also used allyl compounds such as diallyl phthalate, allyl alcohol, methyallyl alcohol, allyl acetate, allyl methacrylate, diallyl carbonate, allyl lactate, allyl alpha-hydroxyisobutyrate, allyltrichloroxylene, allylacrylate, diallylmalonate, diallyloxylate, diallylgluconate, diallyl-methylgluconate, and many others of this general description. The modifying polymerizable material is used in a ratio of from 10 parts to 90 parts of polyester up to 60 to 40 parts of ester, preferably 25 to 35 parts of modifier is used to 65 to 75 parts of polyester.

The ultraviolet absorbers of this invention may also be included with advantage in oil modified alkyd resins which are extensively used in coatings and are very well described in U.S. 2,713,039, U.S. 2,748,092, and U.S. 2,851,431, especially those modified by reaction with styrene. These resins are essentially the reaction products of drying oils and phthalic anhydride with polyhydric alcohols modified by reaction with styrene. Similarly, other surface coating materials such as nitrocellulose and similar materials can also be used.

The preparation, shaping, curing, extrusion, calendering, casting, molding or other forming of these resins is well understood by those skilled in the art and accordingly need not be detailed here. Likewise, the formulation of such resins with various additives including catalysts, promotors, plasticizers, fillers, reinforcing agents like textile glass fibers and fabrics, colorants including pigments and dyes, mold lubricants, flow promoters, inhibitors to promote storage life, thickeners, fire retardant agents and other conventional additives is well known.

In addition to protecting polymer composition itself, the UV absorber defined by Formula I when incorporated into colored polymers also is effective in protecting the dye itself, thus preventing or decreasing fading and color change due to exposure to ultraviolet light.

For the purpose of this invention, the UV absorber of Formula I is incorporated into the polymeric material to be protected in amounts of from 0.01 to 10%, preferably between 0.1 to 2% by weight of the polymeric composition. It may be incorporated into such compositions by conventional means such as by milling the material to be protected, with or without, other additives and/or modifiers.

This invention is further illustrated by the following examples, in which unless otherwise stated, parts are measured on a weight basis.

EXAMPLE 1

*2,4,6-Tris(2-Hydroxy-4-n-Octyloxyphenyl)-s-Triazine*

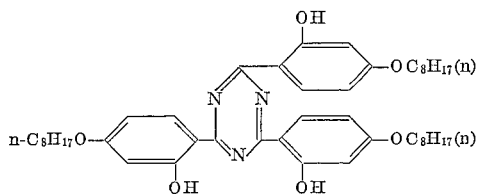

4-octyloxysalicylamide is heated in an open flask at 250° C. for six hours. The residue is cooled, crystallized from pyridine-water and then recrystallized from a benzene-heptane mixture. The purified product melts at about 145–147° C.

*Analysis.*—Calc'd for $C_{45}H_{63}N_3O_6$: C=73.4; H=8.5; N=5.6. Found: C=73.2; H=8.3; N=5.9.

Incorporation of 0.1 part of the product of Example 1 in 100 parts of nitrocellulose protects the latter from the deteriorating effects of ultraviolet light as compared to the control sample containing no UV absorber.

EXAMPLE 2

*2,4,6-Tris(2,4-Dihydroxyphenyl)-s-Triazine*

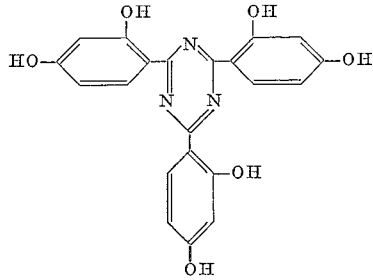

100 parts of cyanuric chloride, 180 parts of resorcinol, 100 parts of aluminum chloride and 1500 parts of tetrachloroethane are refluxed, with stirring, under anhydrous conditions for 18 hours. The solvent is then removed with steam and the residue extracted with boiling alcohol. The insoluble portion is recrystallized from boiling pyridine to give the desired product.

*Analysis.*—Calc'd for $C_{21}H_{15}N_3O_6$: C=62.2; H=3.7; N=10.2. Found: C=62.2; H=3.7; N=10.1.

Incorporation of 0.1 part of the product of Example 2 in 100 parts of an acrylic resin (Orlon 42) protects the latter from the deteriorating effects of ultraviolet light as compared to the control sample.

EXAMPLE 3

*2,4,6-Tris(2-Hydroxy-4-Propoxyphenyl)-s-Triazines*

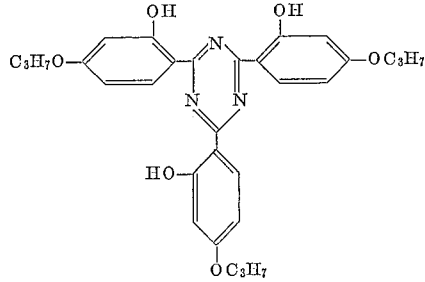

4-propoxysalicylamide is heated at 265° C. for two hours in an open flask. The cooled residue is dissolved in hot benzene and on cooling deposits golden crystals. A recrystallization from a benzene-heptane mixture gives the desired product melting at 202–203° C.

*Analysis.*—Calc'd for $C_{30}H_{33}O_6$: C=67.9; H=6.3; N=7.9. Found: C=68.1; H=6.2; N=7.8.

The same product was also obtained by refluxing 10 parts of 2,4,6-tris(2,4-dihydroxyphenyl)-s-triazine and 10 parts of propyl bromide in 200 parts of 50% aqueous alcohol containing 5 parts of sodium carbonate for 20 hours. The cooled reaction mixture was filtered and the solid collected was triturated with boiling alcohol. The insoluble portion was recrystallized from benzene to yield the desired product.

Replacing propyl bromide with methyl bromide, ethyl bromide, butyl bromide, octyl bromide, dodecyl bromide, 2-ethylhexyl bromide, isooctyl bromide, tetradecyl bromide, octadecyl bromide in the procedure of Example 3, yields the corresponding 4-alkoxy derivatives.

The products thus prepared, when incorporated in polyvinyl chloride-vinylidene chloride resins, protect them from deteriorating effects of ultraviolet light.

EXAMPLE 4

*2,4,6-Tris-(2-Hydroxy-5-Methylphenyl)-s-Triazine*

23.9 parts of cyanuric chloride, 50 parts of p-methylanisole, 55 parts of aluminum chloride and 250 ml. of monochlorobenzene (MCB), under anhydrous conditions, are stirred at room temperature for 16 hours and then heated at 80° C. for 6 hours. The reaction is then treated with dilute HCl and the solvent removed with steam. The residue is extracted with 250 ml. of MCB and the dried organic solution refluxed with 55 parts of aluminum chloride for six hours. Dilute HCl is then added to the cooled reaction mixture and the solvent removed with steam. The solid residue is then triturated with hot ethanol and thei nsoluble residue recrystallized from boiling toluene with activated carbon yielding the product which melts at about 276–278° C.

*Analysis.*—Calc'd. for $C_{24}H_{21}N_3O_3$: C=72.3; H=5.3; N=10.5. Found: C=72.5; H=5.3; N=10.4.

Following the procedure of Example 4 except for the substitution of equivalent amounts of p-octylanisole for the p-methylanisole used therein, there is obtained the product 2,4,6-tris-(2-hydroxy-5-octylphenyl)-s-triazine.

The foregoing products, when incorporated in an amount of 0.2% by weight into polyvinyl chloride resins, protect them from deterioration by ultaviolet light.

EXAMPLE 5

A. *Preparation of 2,4-Dichloro-6-o-Methoxyphenyl-s-Triazine*

110 parts of o-methoxybenzoguanamide, 6 parts of phosphorous pentachloride, 185 ml. of thionyl chloride and 1400 ml. of o-dichlorobenzene are refluxed, with stirring, under anhydrous conditions for 18 hours. Excess thionyl chloride and solvent are removed by distillation under water aspirator vacuum and the residue recrystallized from 1700 ml. of methylcyclohexane and activated charcoal. The crystalline product melts at about 138–139° C.

B. *2,4-Bis-(2,4-Dimethylphenyl)6-o-Hydroxyphenyl-s-Triazine*

25.5 parts of 2,4-dichloro-6-o-methoxyphenyl-s-triazine, 40 parts of aluminum chloride and 300 ml. of meta-xylene are refluxed for 18 hours under anhydrous conditions. The reaction mixture is then poured into cold dilute HCl and the organic layer steam distilled to remove xylene. The residue is cooled and separated by decanting the aqueous layer and then dissolving it in benzene. The dried benzene solution is then evaporated to dryness and the solid residue is recrystallized from heptane and activated charcoal to give the desired product melting at about 130–131° C.

Analysis.—Calc'd. for $C_{25}H_{23}N_3O$: C=78.9; H=6.1; N=11.0. Found: C=79.2; H=6.3; N=11.0.

The products thus prepared when incorporated into a polystyrene resin protect the latter from the deteriorating effects of ultraviolet light.

In the same manner, the following were prepared.

(1) 2,4-DIBROMO-6-(o-HYDROXYPHENYL)-s-TRIAZINE 51 parts of 2,4-dichloro - 6 - (o-methoxyphenyl)-s-triazine in 200 parts o-dichlorobenzene is treated with anhydrous HBr at 150° C. for 20 hours and then flushed with dry air and cooled to room temperature. The precipitated product is collected and recrystallized from methylcyclohexane.

(2) 2(o-HYDROXYPHENYL)-4,6-BIS-(2,4-DIMETHOXYPHENYL)-s-TRIAZINE

To 10.6 parts of 2,4-dibromo-6-(o-hydroxyphenyl)-s-triazine and 8.5 parts of $AlCl_3$ in 150 parts chlorobenzene is slowly added with ice cooling a solution of 17.6 parts of dimethoxybenzene in 50 parts chlorobenzene. The reaction mixture is stirred at room temperature for 16 hours and then poured onto an ice-HCl mixture and steam distilled. The aqueous residue is cooled and filtered and the solid product heated with $Na_2CO_3$ in aqueous alcohol. Filtration and recrystallization of the insoluble product from methylcyclohexane affords the desired product.

α max.=85.4 @ 330 mμ

(3) 2-(o-HYDROXYPHENYL)-4,6-BIS-(2-METHYL-4-METHOXYPHENYL)-s-TRIAZINE

This compound is prepared in a manner similar to that described in (2), substituting 15.6 parts of m-methylanisole for the dimethoxybenzene:

α max.=64.8 @ 340 mμ

EXAMPLE 6

*2,4-Bis-(2,4-Dihydroxyphenyl)6-o-Hydroxyphenyl-s-Triazine*

25.5 parts of 2,4-dichloro-6-o-methoxyphenyl - s - triazine, 40 parts of aluminum chloride, 24.2 parts of resorcinol and 400 parts of tetrachloroethane are refluxed, with stirring, under anhydrous conditions for 19 hours. The reaction mixture is treated with dilute HCl and steam distilled to remove the organic solvent and the solid residue then extracted with hot ethanol. The alcohol insoluble residue is recrystallized from boiling pyridine.

Analysis.—Calc'd. for $C_{21}H_{15}N_3O_5$: C=64.8; H=3.9; N=10.8. Found: C=64.8; H=3.8; N=10.9.

EXAMPLE 7

*2-(2,4-Dimethylphenyl)-4-(2,4-Dihydroxyphenyl-6-(o-Hydroxyphenyl)-s-Triazine*

25.5 parts of 2,4-dichloro-6-o-methoxyphenyl-s-triazine, 13.3 parts of aluminum chloride, 11 parts of resorcinol and 300 ml. of monochlorobenzene are stirred under anhydrous conditions for 18 hours at room temperature and then at 90° C. for 4 hours. The cooled reaction mixture is treated with 13.3 parts of aluminum chloride and 200 ml. of meta-xylene and allowed to stir at 90° C. for 8 hours. The solvent is removed with steam and the residue extracted with boiling ethanol. The alcohol solution is evaporated to dryness and the residue is then recrystallized from boiling ethanol.

EXAMPLE 8

*2,4,6-Tris-(2-Hydroxy-1-Naphthyl)-s-Triazine*

31 parts of cyanuric chloride, 48 parts of beta-naphthol, 31 parts of aluminum chloride and 200 parts of tetrachloroethane are heated at 90° C. for three hours while stirring under anhydrous conditions and then allowed to stand at room temperature for 16 hours. The reaction mixture is drowned in cold dilute HCl and the solvent removed with steam. The residue is purified by dissolving it in caustic, reprecipitating with acid and then recrystallizing it from a pyridine-acetone mixture.

Analysis.—Calc'd. for $C_{33}H_{21}N_3O_3$: C=78.0; H=4.1; N=8.3; O=9.45. Found: C=77.5; H=3.9; N=8.4; O=9.5.

EXAMPLE 9

*Preparation of Sulfonic Acid Derivative of 2,4,6-Tris-(o-Hydroxyphenyl)-s-Triazine*

35.7 parts of 2,4,6-tris-(o-hydroxyphenyl)-s-triazine is treated with an excess of concentrated sulfuric acid at about 75° C. By this reaction, a 2-hydroxy-5-sulfo phenyl derivative is obtained.

EXAMPLE 10

*2,4-Bis-(2-Hydroxy-5-Carboxyphenyl)-6-(o-Hydroxyphenyl)-s-Triazine*

The procedure of Example 5, Part B is followed except that the 300 ml. of xylene is replaced with 28.0 parts of ethyl p-methoxybenzoate and 200 ml. of o-dichlorobenzene. The intermediate ester is converted to the free acid compound during the steam distillation to remove the solvents.

EXAMPLE 11

Following the procedure of Example 4 except for the substitution of p-methylanisole with 56 parts of p-chloroanisole there is obtained the product 2,4,6-tris-(2-hydroxy-5-chloro-s-triazine).

EXAMPLE 12

*2,4,6-Tris-(2,4-Dihydroxy-6-Hexylphenyl)-s-Triazine*

A suspension containing 18.4 parts of cyanuric chloride, 58.0 parts of 4-hexylresorcinol and 46.5 parts of $AlCl_3$ in 500 ml. of monochlorobenzene is cooled until the initial exotherm subsides. It is then heated for 2 hours at 75° C. and then at 100° C. for another 2 hours. After cooling, the reaction mixture is poured into an ice-HCl mixture and stirred. The aqueous portion is decanted and the organic layer steam distilled. The residue is filtered and washed with a dilute $NaHCO_3$ solution and water and then dried. A benzene solution of the solid is drowned with heptane and the ensuing product recrystallized from hot glacial acetic acid and norite. The product does not melt at 360° C.

Analysis.—Calc'd for $C_{39}H_{51}N_3O_6$: C=70.0; H=7.75; N=6.62. Found: C=69.77; H=7.15; N=6.75.

α-Max.=75.7 at 375 mμ, ε max.=50,000

EXAMPLE 13

*2-(2,4-Dihydroxyphenyl)-4,6-Diphenyl-s-Triazine*

Free benzamidine is prepared from 13.1 parts of its HCl salt and added, as an ether solution, to 20 parts of phenyl-β-resorcylate in 50 ml. of alcohol. The red solution after 18 hours reflux turns yellow and a yellow solid precipitates. The product is filtered and yields 6 g. of crude product melting at about 273–274° C. Recrystallization from glacial acetic acid yields the pure product melting at about 275–275.5° C.

Analysis.—Calc'd for $C_{21}H_{15}N_3O_2$: C=73.89; H=4.43; N = 12.31; O = 9.37. Found: C = 73.44; H = 4.49; N=12.17; O=9.52.

α-Max.=52.2 at 344 mμ, ε max.=17,800

EXAMPLE 14

*2-o-Hydroxyphenyl-4,6-Bis-(4-Methoxyphenyl)-s-Triazine*

To 22 parts of 2,4-dichloro-6-(o-methoxyphenyl)-s-triazine and 34.5 parts of $AlCl_3$ is added 110 parts of anisole over a 15 minute period with stirring and ice cooling. The temperature is raised to 70° C. for 16 hours and then to 130° C. for 4 hours. The cooled reaction mixture is poured onto ice-HCl and steam distilled. The residue is filtered and the solid triturated with hot ethanol. The yellow product is recrystallized from benzene-heptane and melts at 195–196° C.

*Analysis.*—Calc'd for $C_{23}H_{19}N_3O_3$: C, 71.67; H, 4.97; N, 10.90. Found: C, 71.79; H, 4.90; N, 10.78.

α-Max.=128.5 at 320 mμ, ε max.=50,000

EXAMPLE 15

*2,4,6-Tris-(2,4-Dimethoxyphenyl)-s-Triazine and 2,4-Bis-(2-Hydroxy-4-Methoxyphenyl)-6-(2,4-Dimethoxyphenyl)-s-Triazine*

A solution of 18.4 parts of cyanuric chloride in 100 parts of dimethoxybenzene (DMB) is added over a period of ½ hour to a cold suspension of 39.9 parts of $AlCl_3$ in 100 parts of DMB with vigorous stirring. After 1 hour the reaction mixture is heated at 75° C. for 14 hours after which it is cooled and poured onto ice-HCl and steam distilled. The residue is filtered and the viscous filtrate made basic with dilute $Na_2CO_3$ and then extracted with hot benzene. Addition of dilute HCl to the benzene solution precipitates a solid which is collected and triturated in hot ethanol. The insoluble residue is recrystallized from toluene and activated charcoal affording the compound 2,4 - bis(2-hydroxy-4-methoxyphenyl)-6-(2,4-dimethoxyphenyl)-s-triazine, melting at 184–185° C.

*Analysis.*—Calc'd for $C_{25}H_{23}N_3O_6$: C, 65.10; H, 5.03; N, 9.12; O, 20.75. Found: C, 65.04; H, 5.15; N, 9.24; O, 20.75.

α-Max.=97.5 at 333 mμ, ε max.=45,000

The alcoholic filtrate is cooled to yield 2,4,6-tris-(2,4-dimethoxyphenyl)-s-triazine, melting at 94–95° C.

*Analysis.*—Calc'd for $C_{27}H_{27}N_3O_6$: C, 66.24; H, 5.56; N, 8.58; O, 19.61. Found: C, 66.32; H, 5.40; N, 8.88; O, 19.20.

α-Max.=86.0 at 313 mμ, ε max.=42,000

Controlled dealkylation with HBr of the latter compounds yields 2-(4-methoxy-2-hydroxyphenyl)-4,6-(2,4-dimethoxyphenyl)-s-triazine.

EXAMPLE 16

*2,4-Bis-(2,4-Dihydroxyphenyl)-6-(4-Methoxyphenyl)-s-Triazine*

An ether solution containing 42.4 parts of p-methoxyphenylmagnesium bromide is added slowly, with cooling, to a solution of 23.0 parts of cyanuric chloride in 200 parts of benzene and the mixture stirred overnight. The solvent is removed and the solid residue extracted with hot chlorobenzene. This solution is reacted 18 hours at 90° C. with 41 parts of resorcinol and 26.6 parts of $AlCl_3$. The suspension is filtered and poured onto an ice-HCl mixture and heated to 80° C. and filtered hot. The yellow solid is dissolved in hot pyridine and cooled. The first crop of crystals is removed and the filtrate drowned with water to precipitate the desired product which is recrystallized from pyridine and found to melt over 360° C.

*Analysis.*—Calc'd for $C_{22}H_{17}N_3O_5$: C, 65.5; H, 4.25; N, 10.4. Found: C, 65.15; H, 4.56; N, 10.21.

α-Max.=103.4 at 360 mμ, ε max.=41,500

EXAMPLE 17

The following mixture is prepared:

| | Parts |
|---|---|
| Polyvinyl chloride polymer | 100 |
| Dioctyl phthalate | 45 |
| Dioctyl adipate | 15 |
| Epoxidized soybean oil | 5 |
| Alkylated aryl phosphites | 1 |
| Stearic acid | 0.25 |
| 2,4,6-tris-(2-hydroxyphenyl)-s-triazine | 0.1 |

The ingredients are placed in a jar mill and rolled for six hours, after which the mixture is coated on a chrome sheet (15 mil. thickness) and then oven-cured at 166° F. for three minutes. A portion which is tested on the Fade-Ometer lasts 2200 hours before appearance of the first spot and 2740 hours before the tenth spot. A control sample without any absorber is also tested on the Fade-Ometer. It shows the first spot in 1380 hours and the tenth spot in only 1580 hours.

EXAMPLE 18

A mixture of the following is prepared:

| | Parts |
|---|---|
| Polyvinyl chloride | 100 |
| Dioctyl phthalate | 45 |
| Epoxidized soybean oil | 5 |
| Barium-cadmium phenolate | 2 |
| Alkylated aryl phosphite | 1 |
| Stearic acid | 0.5 |
| 2,4,6-tris-(2-hydroxyphenyl)-s-triazine | 0.1 |

The ingredients are ball milled for six hours and then milled on a two roll hot mill. The resin is then compress-molded into 50 ml. chips.

Samples of the chips are tested on a Fade-Ometer and weather tested. Control samples without ultraviolet absorber are identically tested. Whereas the control sample develops its tenth spot in only 1650 hours, the protected sample lasts for more than 2460 hours without developing any spots. The test sample is correspondingly superior to the control sample in the weather test.

EXAMPLE 19

*Protection of Dyed Polystyrene Against Ultraviolet Light*

A number of oil soluble dyes as such and containing 0.1% tris-(2-hydroxy-4-octyloxyphenyl)-s-triazine as a UV absorber were milled into general purpose polystyrene and the plastic was then exposed in a Fade-Ometer for 160 hours. During exposure at 20, 40, 80, and 160 hour intervals the degree of change in color was measured using a colormaster (results expressed in NBS units, National Bureau of Standards)

COLOR CHANGE (NBS UNITS)

| Sample | Color Change (NBS Units) (After "4"Hours in Fade-Ometer) | | | |
|---|---|---|---|---|
| | 20 Hr. | 40 Hr. | 80 Hr. | 160 Hr. |
| 0.2% (CI 26120) [1] | 13.5 | 18.7 | 41.1 | -------- |
| 0.2% (CI 26120)+UV absorber | 5.6 | 12.3 | 22.1 | -------- |
| 0.2% (CI 12055) | 21.4 | 34.0 | 57.6 | -------- |
| 0.2% CI 12055+UV absorber | 2.2 | 4.9 | 19.6 | -------- |
| 0.2% Yellow ZG | 5.9 | 9.5 | 27.3 | -------- |
| 0.2% Yellow ZG+UV absorber | 1.6 | 3.5 | 13.2 | -------- |
| 0.2% Blue ZN | 4.5 | 4.7 | 13.3 | 24.2 |
| 0.2% Blue ZN+UV absorber | 0.4 | 1.4 | 4.6 | 7.3 |

[1] CI is abbreviation for color index.

EXAMPLE 20

100 parts of polycinylchloride resin, 50 parts of dioctyl phthalate, 2 parts of barium-cadmium laurate and 1 part of a chelating agent (Mark XX) are ball-milled for six hours. Portions of this resin mixture are then separately milled on a two-roll hot mill with the ultraviolet absorbers of this invention. 50 ml. chips, formed by compress molding the ultraviolet absorber resin mixture are tested for stability to ultraviolet light.

The results are shown below:

*2,4,6-Tris-(4-R-2-Hydroxyphenyl)-Triazines in Polyvinyl Chloride*

| UV Absorber | Percent | Yellow Factor | | |
|---|---|---|---|---|
| | | 1st | 10th Spot | Outdoors months |
| Control | | 200 | 300 | 3 |
| R=n-propoxy | 0.10 | 1,940 | 1,980 | 6 |
| R=n-octyloxy | 0.10 | 1,120 | 2,240 | 6 |
| R=H | 0.10 | 2,160 | 2,500 | 6 |

EXAMPLE 21

2-(2-hydroxyphenyl) - 4,6 - (2,4-dimethylphenyl)-s-triazine (.2%) was incorporated into polystyrene by milling and a ⅛" sheet was molded. The sample along with the control was exposed in a Fade-Ometer (FOM) and Yellow Index was determined to be as follows:

| | Yellow Index (Hrs. in FOM) | | | | |
|---|---|---|---|---|---|
| | 0 | 200 | 300 | 400 | 500 |
| Control | 6.5 | 15.7 | 20.4 | ------ | 28.8 |
| 2-(2-hydroxyphenyl)-4,6-(2,4-di-methyl-phenyl)-s-triazine | 5.8 | 10.0 | 12.0 | 12.4 | 16.7 |

EXAMPLE 22

100 parts of rigid polyvinyl chloride, 3 parts of octyl epoxy stearate (Drapex 4.4), 3 parts of barium-cadmium organic complex (Mark 99), 1 part of an organic chelating agent (Mark C), 0.5 part of stearic acid and 0.1% (by weight of the polyvinyl chloride resin) of the ultraviolet absorber were milled and molded into films approximately 20 ml. thick. These films were exposed under the sunlamp and in the weatherometer and the yellow factor was determined. The results were as follows:

| | Yellow Factor | | |
|---|---|---|---|
| | Original Color | Weatherometer 100 Hrs. | Sunlamp 40 Hrs. |
| Control | 5.4 | 17.2 | 15.6 |
| 2,4,6-tris-(2-hydroxy-4-propxyphenyl)-s-triazine | 5.7 | 8.3 | 9.3 |
| 2,4,6-(2-hydroxy-4-octyloxyphenyl)-s-triazine | 5.7 | 11.6 | 10.0 |

We claim:
1. 2,4,6-tris-(2-hydroxy - 4 - alkoxyphenyl)-s-triazine wherein the alkoxy radical has up to eighteen carbon atoms.
2. 2,4,6-tris-(2-hydroxy-4-methoxyphenyl)-s-triazine.
3. 2,4,6-tris-(2-hydroxy-4-n-octyloxyphenyl)-s-triazine.
4. 2,4,6-tris-(2,4-dihydroxyphenyl)-s-triazine.
5. 2,4,6-tris-(2-hydroxy-4-propoxyphenyl)-s-triazine.

References Cited in the file of this patent

UNITED STATES PATENTS

| | | |
|---|---|---|
| 1,549,901 | Bonhote | Aug. 18, 1925 |
| 1,551,095 | Fritzsche et al. | Aug. 25, 1925 |
| 1,566,742 | Fritzsche et al. | Dec. 22, 1925 |
| 2,393,802 | Morey et al. | Jan. 29, 1946 |
| 2,750,379 | Hanslick et al. | June 12, 1956 |
| 2,831,777 | Meyer et al. | Apr. 22, 1958 |

OTHER REFERENCES

Smolin et al.: "s-Triazines and Derivatives," pages 148, 152 to 153, 159, 162 to 164 and 172–175. Interscience Publishers Inc. (1959).

UNITED STATES PATENT OFFICE
CERTIFICATE OF CORRECTION

Patent No. 3,118,887                              January 21, 1964

William B. Hardy et al.

It is hereby certified that error appears in the above numbered patent requiring correction and that the said Letters Patent should read as corrected below.

Column 3, line 39, for "parafomaldehyde" read -- paraformaldehyde --; line 57, for "termnial" read -- terminal --; column 4, line 42, for "methyallyl" read -- methallyl --; lines 65 and 66, for "promotors" read -- promoters --; column 6, line 39, for "thei nsoluble" read -- the insoluble --; line 50, for "ultaviolet" read -- ultraviolet --; column 7, line 56, after "Dihydroxyphenyl" insert a closing parenthesis; column 8, line 16, for "-sulfo" read -- -sulfo --; column 10, line 68, for "polycinylchloride" read -- polyvinylchloride --; column 12, in the table, first column, line 2 thereof, for "-propxyphenyl)-" read -- -propoxyphenyl)- --.

Signed and sealed this 17th day of November 1964.

(SEAL)
Attest:

ERNEST W. SWIDER                              EDWARD J. BRENNER
Attesting Officer                           Commissioner of Patents